(12) United States Patent
Ebarb et al.

(10) Patent No.: US 9,456,597 B1
(45) Date of Patent: Oct. 4, 2016

(54) LOCKABLE AND ADJUSTABLE FRICTION GAME CALL APPARATUS AND METHODS

(75) Inventors: Justin Ebarb, Wesson, MS (US); Anthony Foster, Brookhaven, MS (US)

(73) Assignee: PRIMOS, INC., Flora, MS (US)

( * ) Notice: Subject to any disclaimer, the term of this patent is extended or adjusted under 35 U.S.C. 154(b) by 412 days.

(21) Appl. No.: 13/533,690

(22) Filed: Jun. 26, 2012

(51) Int. Cl.
*A01M 31/00* (2006.01)

(52) U.S. Cl.
CPC .................................. *A01M 31/004* (2013.01)

(58) Field of Classification Search
CPC ............................... A63H 5/00; A01M 31/004
USPC .......................................... 446/397, 418, 422
See application file for complete search history.

(56) References Cited

U.S. PATENT DOCUMENTS

| | | | |
|---|---|---|---|
| 1,449,756 A * | 3/1923 | Jackson ................... | A63H 5/00 446/397 |
| 2,573,856 A * | 11/1951 | Malone .................... | A63H 5/04 116/137 R |
| 2,606,401 A | 8/1952 | Boatwright | |
| 2,643,483 A | 6/1953 | Walker | |
| 3,367,064 A | 2/1968 | Anthony et al. | |
| 4,041,639 A | 8/1977 | Funk | |
| 4,310,986 A | 1/1982 | Jacobs | |
| 4,527,985 A * | 7/1985 | Zoschg ............... | A01M 31/004 24/68 F |
| 4,606,733 A * | 8/1986 | Willis .................. | A01M 31/004 446/397 |
| 4,862,625 A | 9/1989 | Dolan | |
| 4,955,845 A | 9/1990 | Piper | |
| 5,352,146 A * | 10/1994 | Shuart .................... | F41B 5/1469 124/35.1 |
| 5,380,235 A * | 1/1995 | Forbes ................ | A01M 31/004 446/397 |
| 5,450,684 A * | 9/1995 | Harris ..................... | F41A 17/54 42/70.07 |
| 5,546,692 A | 8/1996 | Byers | |
| 5,791,081 A | 8/1998 | Turner et al. | |
| 5,921,842 A | 7/1999 | Allenby | |
| 6,709,309 B1 * | 3/2004 | Bishop ................ | A01M 31/004 446/188 |
| 6,872,118 B1 * | 3/2005 | Bishop ................ | A01M 31/004 446/176 |
| 2007/0224908 A1 * | 9/2007 | Vaught ................ | A01M 31/004 446/213 |

* cited by examiner

*Primary Examiner* — Gene Kim
*Assistant Examiner* — Alyssa Hylinski
(74) *Attorney, Agent, or Firm* — Holland & Hart

(57) ABSTRACT

A game call that includes a push rod, a friction plate, a striker, first and second biasing members, and a locking sleeve. The push rod includes distal and proximal end portions. The friction plate is mounted to the push rod. The first biasing member is configured to bias the push rod in a proximal direction. The second biasing member is configured to rotate the friction plate into contact with the striker. The locking sleeve is connected to the push rod and configured to fix an axial position of the friction plate relative to the striker.

14 Claims, 11 Drawing Sheets

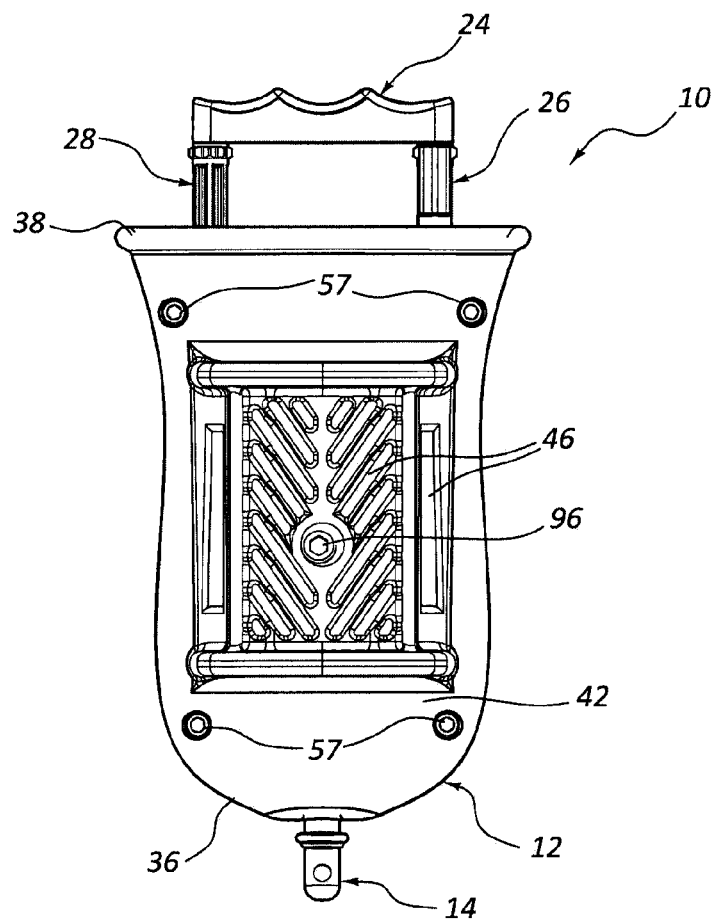
FIG. 4
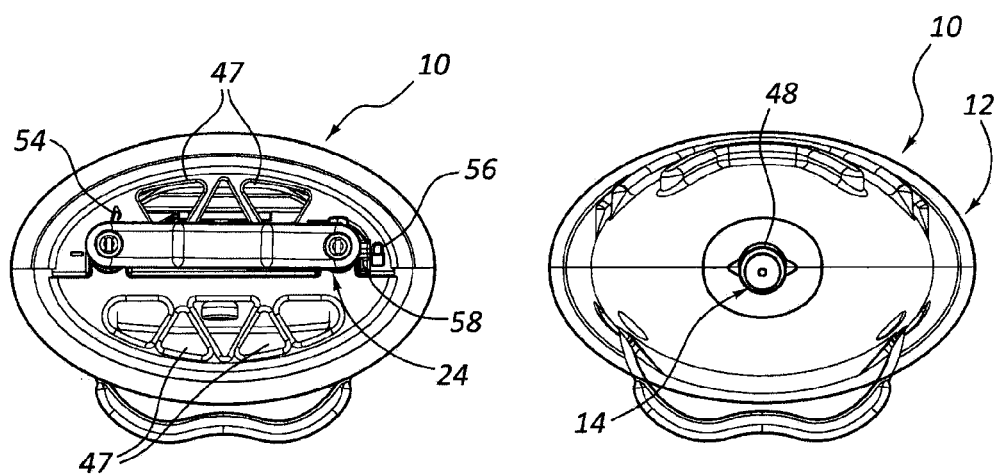
FIG. 5A  FIG. 5B

LOCKABLE AND ADJUSTABLE FRICTION GAME CALL APPARATUS AND METHODS

BACKGROUND

Many types of game calls have been developed over the years for a variety of purposes. Game calls have primarily been developed for simulating the sounds of wild animals. Among others, game calls have been developed to simulate the sounds of big game animals, such as elk and deer, as well as birds and small game.

Turkey calls, in particular, have been the subject of significant research and development efforts over the years. A variety of different types of turkey calls have been developed. Friction calls may broadly be described as one category of game calls used for producing wild turkey sounds. Within the broad category of friction calls is the narrower category that involves a flat calling surface (e.g., a flat piece of slate, glass, crystal, aluminum, or any other suitable material often referred to as a friction plate) and a striker for contacting the calling surface to produce sounds of wild animals. The flat calling surface is commonly disc-shaped, but those skilled in the art will understand that a calling surface may be of any shape or size. To create appropriate sounds with this type of friction call, the calling surface is typically conditioned or treated (using sand paper, an emery cloth, a Brillo pad, a stone, or some other abrasive material) to increase the friction resulting from contact between the calling surface and the striker. The striker may be made out of a number of different materials, such as wood, metal, plastic, or any other suitable material as understood by those skilled in the art.

Most traditional friction calls have been hand-held calls. In using these traditional friction calls, two hands are often used: one hand to hold the portion of the call that includes the calling surface; another hand to hold the striker. For obvious reasons, using both hands for friction calls has disadvantages. If two hands are used to operate the game call, the person using the call may not have a firearm or bow in a "ready" position for shooting when operating the game call. Turkeys, for example, have phenomenal eyesight, and may catch even the smallest of movements when they are within shooting range. The more movement when calling turkeys, the more likely a turkey will see the person doing the calling. The actions of putting down the game call and picking up a bow or firearm require movement which may result in a lost opportunity to harvest the game animal.

Still another problem with traditional friction calls relates to inadvertent operation when transporting or storing the game call. Even the slightest relative movement between the striker and the friction member typically generates sounds. These sounds, when generated at inopportune times, may alert the game to the hunter's presence.

In view of the foregoing, opportunities exist for improvements in construction, storability, and operation of friction type game calls.

SUMMARY

One aspect of the present disclosure relates to a game call that includes a push rod, a friction plate, a striker, first and second biasing members, and a locking sleeve. The push rod includes distal and proximal end portions. The friction plate is mounted to the push rod. The first biasing member is configured to bias the push rod in a proximal direction. The second biasing member is configured to rotate the friction plate into contact with the striker. The locking sleeve is connected to the push rod and configured to fix an axial position of the friction plate relative to the striker.

Tension in the second biasing member may be adjustable to alter a rotational force applied to rotate the friction plate. The push rod may include first and second legs, wherein the friction plate and second biasing member are mounted to the first leg, and the locking sleeve is mounted to the second leg. The first biasing member may be positioned at the distal end portion of the push rod, and the locking sleeve may be positioned at the proximal end portion of the push rod.

The game call may further include a tone board, with the striker being mounted to the tone board. The game call may include a housing, the striker may be fixed relative to the housing, with the push rod and friction plate being movable relative to the housing. The locking sleeve may rotate between a locked position and an unlocked position. The game call may include a tone adjustment member connected to the second biasing member and rotatable to adjust tension in the second biasing member.

Another aspect of the present disclosure is directed to a game call that includes a striker, a friction plate, and a locking member. The friction plate is configured to contact the striker to generate sound, wherein the striker and friction plate are rotatably biased into contact with each other. The locking member is operable to fix a position of the striker relative to the friction plate in at least one direction of motion to limit creation of sound.

The game call may include a tone adjustment member operable to adjust a rotatational bias force applied between the striker and the friction plate. The game call may include a push rod, wherein the friction plate is connected to the push rod and the push rod is axially movable to move the friction plate relative to the striker. The locking member may be mounted to the push rod. The game call may include a biasing member, a push rod, and a housing, wherein the biasing member is operable to bias the push rod into a first position relative to the housing. The striker may comprise wood and the friction plate may comprise glass. The game call may include a tone board and the striker may be connected to the tone board.

A further aspect of the present disclosure relates to a method of operating a game call. The method includes providing a housing, a push rod, a friction plate, a striker, and a locking member, wherein at least one of the friction plate and striker is connected to the push rod. The method may include moving the push rod axially relative to the housing to move the friction plate and striker into sliding contact with each other to generate sound, and operating the locking member to fix a position of the push rod relative to the housing to fix a position of the striker relative to the housing to limit generation of sound.

The striker may be mounted to the housing and the friction plate may be mounted to the push rod, wherein the friction plate is movable relative to the striker. The game call may further include a biasing member configured to rotate the friction plate relative to the push rod and into contact with the striker. The push rod may include first and second legs. The friction plate may be mounted to the first leg and the locking member may be mounted to the second leg. The method may include biasing the push rod in a first direction and moving the push rod axially in a second direction, which is opposite to the first direction, to move the friction plate and striker into sliding contact with each other to generate sound.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are part of the specification. Together with the following description these drawings demonstrate and explain various principles of the instant disclosure.

FIG. 4 is a bottom view of the game call of FIG. 1.

FIG. 5A is a rear view of the game call of FIG. 1.

FIG. 5B is a front view of the game call of FIG. 1.

DETAILED DESCRIPTION

Figure 1:
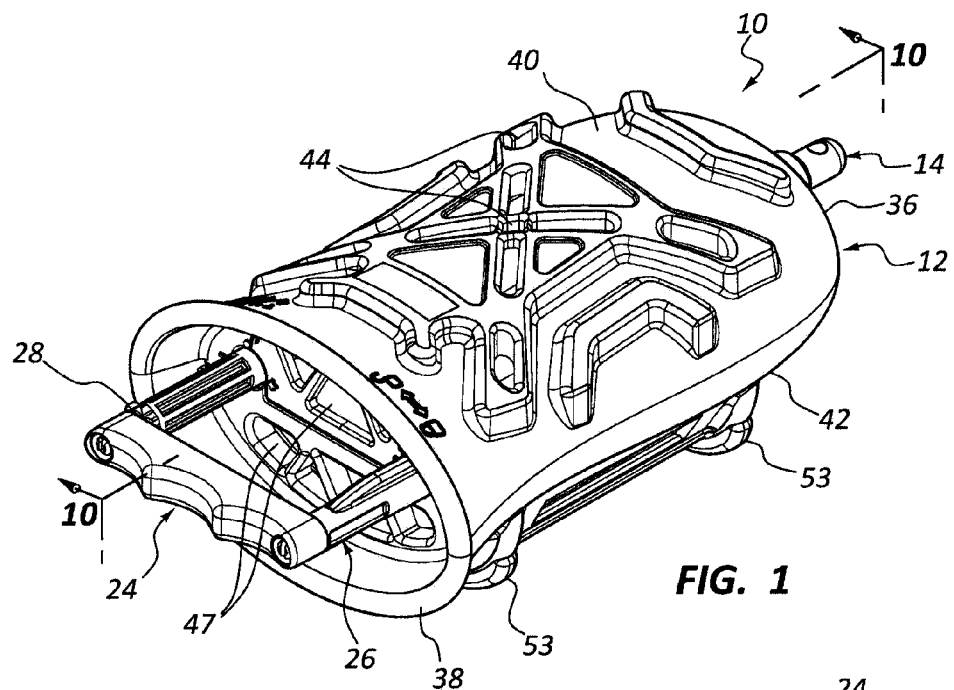
FIG. 1 is a perspective view of an example game call in accordance with the present disclosure.

Throughout the drawings, identical reference characters and descriptions indicate similar, but not necessarily identical, elements. While embodiments of the instant disclosure are susceptible to various modifications and alternative forms, specific embodiments have been shown by way of example in the drawings and will be described in detail herein. However, one of skill in the art will understand that embodiments of the instant disclosure are not intended to be limited to the particular forms disclosed herein. Rather, the instant disclosure covers all modifications, equivalents, and alternatives falling within the scope of embodiments defined by the appended claims.

One aspect of the present disclosure is directed to a game call that is operable to lock a position of the striker relative to the friction plate. The term "friction plate" will be used interchangeably throughout the following description to describe any type of friction member or calling surface such as a piece of slate, glass, wood, carbon, or other structure that generates sound when contacted by a striker. The striker may include materials such as, for example, wood, styrene, carbon or other suitable materials known to those skilled in the art. The game calls disclosed herein may be referred to as turkey game calls and may operate to generate sounds that mimic sounds created by live turkeys.

A further aspect of the present disclosure is directed to a game call wherein the striker and friction plate are biased into contact with each other, and the game call is operable to move the striker across a surface of the friction plate to generate sound. The force (e.g. biasing force) that moves the friction plate and striker into contact with each other may be adjustable to tune the sound generated by the game call as the striker is moved across a surface of the friction plate.

Another aspect of the present disclosure relates to generating sound by rotating one of a striker and a friction plate about an axis into contact with the other of the striker and friction plate, and then moving the striker and friction relative to each other in a direction parallel with the axis while maintaining the contact.

An example game call includes a push rod having first and second legs. One of the legs of the push rod carries a locking member and another leg of the push rod carries a tone adjustment member. One of the friction plate or striker may be mounted to the push rod and the other of the striker and friction plate may be fixed within a housing. The push rod extends through the housing. Operating the push rod in a longitudinal or axial direction moves the striker across a friction surface of the friction plate to generate sound. The locking member operates to fix a position of the push rod relative to the housing, thereby fixing a position of the striker relative to the friction plate. Locking the striker relative to the friction plate may limit relative movement therebetween and thereby prevent unwanted sound when the game call is not intended to be operated. The tone adjustment member may adjust a biasing force that biases the friction plate and striker into contact with each other.

In one example, a friction plate is pivotally mounted to the push rod (e.g., one of the first and second legs of the push rod). A biasing member (e.g. spring) may apply a rotational bias force to the friction plate to rotate the friction plate into contact with the striker. The striker may be held in a fixed position within the housing of the game call. The striker may be mounted to a tone board. Operating the push rod in a longitudinal direction relative to the housing may move the friction plate, which is biased into contact with the striker, relative to the striker in a longitudinal direction to generate sound.

The game call may include a push rod biasing member that biases the push rod into a first or rest position. Operating the push rod axially in a forward direction against biasing forces of the push rod biasing member moves the friction plate across the striker into an advanced position to generate sound. The push rod biasing member biases the push rod from the advanced position back to the rest position upon releasing the force applied to advance the push rod. In one example, the push rod may be retracted from the rest position into a retracted position in which the locking member is operable into a locked position to fix an axial position of the push rod relative to the housing. In other arrangements, the locking member may be operable between locked and unlocked positions while the push rod is in the rest position rather than the retracted position.

The tone adjustment member may be rotatably mounted to a leg of the push rod. The tone adjustment member may be moved axially as well as rotationally relative to the push rod. The tone adjustment member may include an adjustment feature that maintains a rotated position of the tone adjustment member relative to the push rod to hold a given tension applied in a biasing member that biases the friction plate into contact with the striker. In one example, a handle is mounted to the push rod. The tone adjustment member may be fixed in a given rotated position relative to the handle to maintain a tension adjustment in the biasing member made by rotating the tone adjustment member.

Although the examples disclosed show the friction plate mounted to the push rod and the striker maintained in a fixed position relative to the housing, other arrangements are possible in which the friction plate and striker are switched in their orientation so that the striker is carried by the movable push rod and the friction plate is maintained in a fixed position relative to the housing. For example, a tone board may be pivotally mounted to a leg of the push rod and the striker is mounted to the tone board. The friction plate may be fixed within the housing such that advancing and retracting the push rod moves the striker relative to the fixed friction plate to generate sound.

The housing of the game call may include a plurality of openings that provide a pathway for sound to escape the internal cavity of the housing. The housing may include a plurality of gripping features that help the operator hold the housing. In at least one example, the game call may be configured for a single hand operation. For example, the operator may hold the housing between a thumb and fingers of one hand, and use other fingers of the same hand to operate the push rod axially relative to the housing to generate sound. The housing may include legs or other support features that orient the game call in a position parallel to a support surface upon which the game call rests.

Referring now to FIGS. 1-12B, and in particular FIGS. 1, 7A-B, 9 and 10, a game call 10 includes a housing 12, a push rod 14, a friction plate 16, and a striker 18. The game call 10 also includes first and second biasing members 20, 22, a handle 24, a locking sleeve 26, a tone adjustment member 28, and a tone board 30. The push rod 14 moves axially within the housing 12. The friction plate 16 is mounted to the push rod 14. The striker 18 is mounted to the tone board 30 and maintained in a fixed position within the housing 12. The push rod 14 moves axially against biasing forces of the first biasing member 20. The second biasing member 22 applies a rotational bias force to the friction plate 16 to rotate the friction plate 16 into contact with the striker 18. The handle 24 is mounted at a proximal end of the push rod 14 and provides an engagement surface for the operator to move the push rod 14 relative to housing 12. The locking sleeve 26 operates to lock an axially position of the push rod 14 relative to the housing 12. The tone adjustment member 28 is operable to adjust tension in the second biasing member 22 thereby adjusting the rotational bias force applied by the second biasing member 22 to the friction plate 16.

Figure 7A:
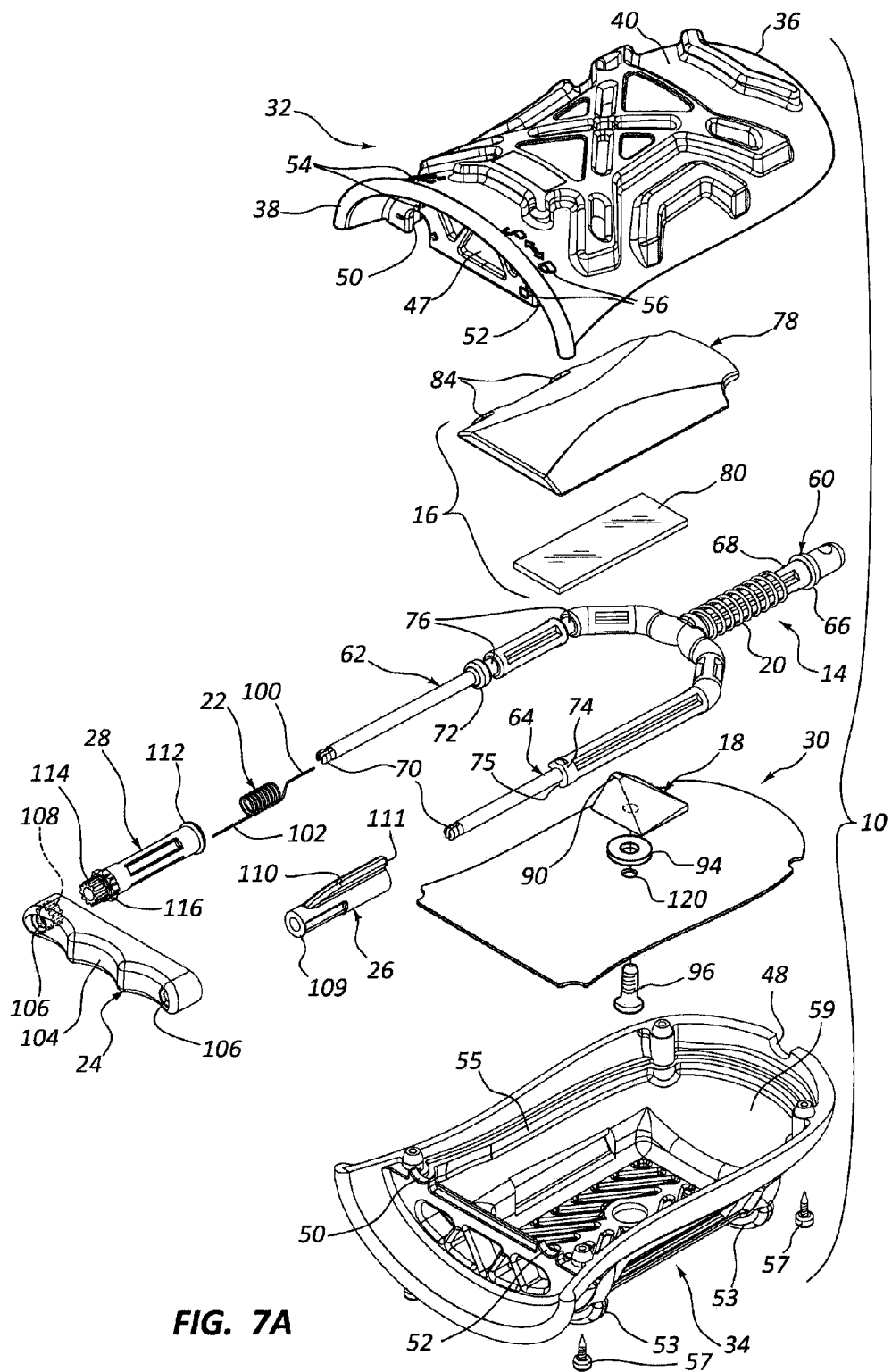
FIGS. 7A and 7B are exploded perspective views of the game call of FIG. 1.
Figure 7B:
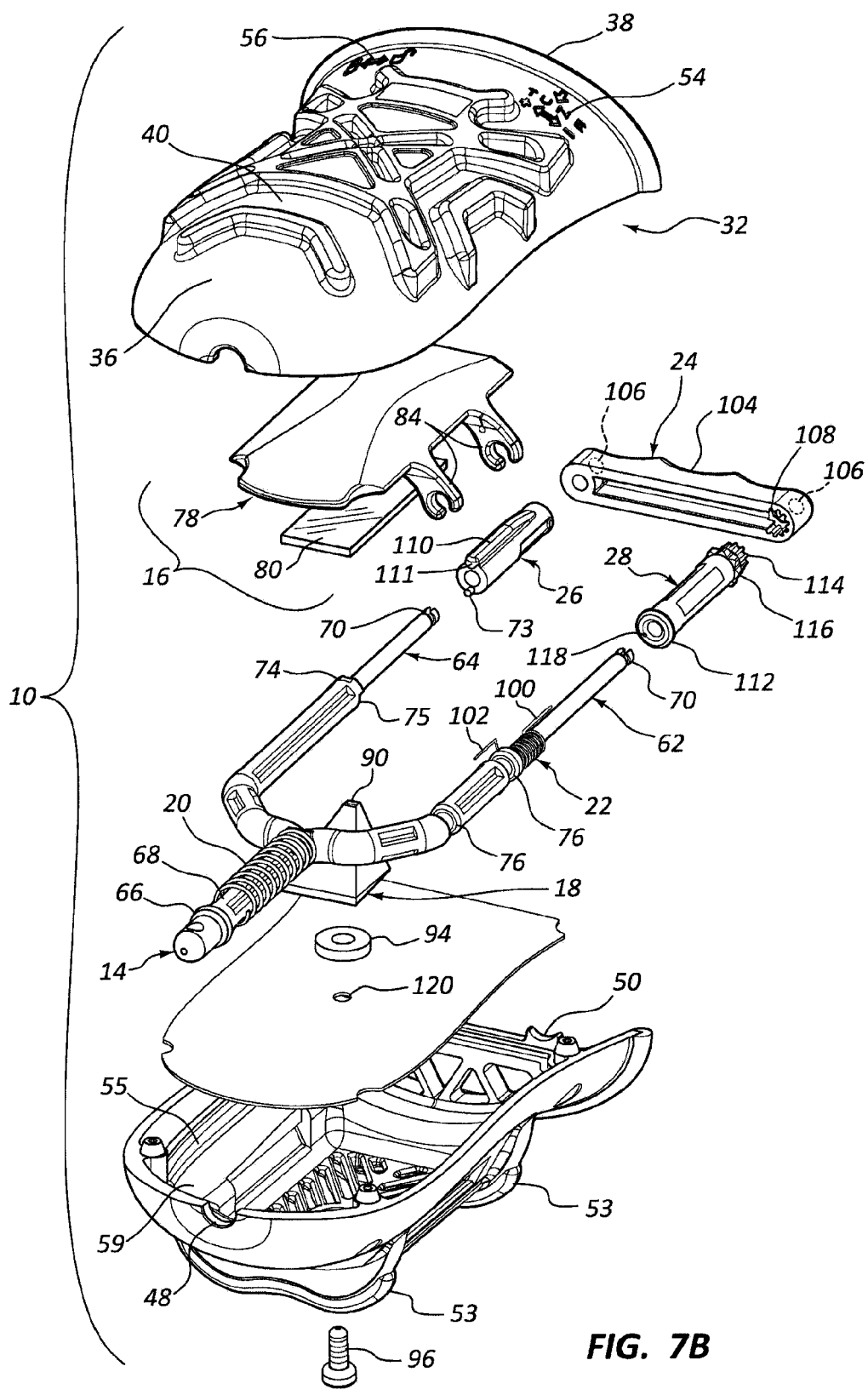

The housing 12 is shown in FIGS. 1 and 7A-B including top and bottom housing members 32, 34, front and rear ends 36, 38, top and bottom surfaces 40, 42, top and bottom openings 44, 46, rear openings 47, a front rod opening 48, and first and second rear rod openings 50, 52. Housing 12 also includes support members 53 along the bottom surface 42, adjustment indicia 54, a support surface 55, locking indicia 56, housing fasteners 57, a lock recess 58, and an interior 59.

The top and bottom housing members 32, 34 may be secured together with the housing fasteners 57. The top and bottom openings 44, 46 and rear openings 47 may provide openings through which sound generated within the interior 59 is able to travel out of the housing 12. Additional openings may be positioned at other locations on housing 12 such as, for example, along either of the side surfaces or the front end 36. The top, bottom and rear openings 44, 46, 47 may have any desired shape and size. The front rod opening 48 may be sized for a portion of the push rod 14 to extend therethrough. The first and second rod openings 50, 52 may be sized for different portions of the push rod 14 and other features, such as the locking sleeve 26 and tone adjustment member 28 to travel into and out of the housing 12.

Figure 2:
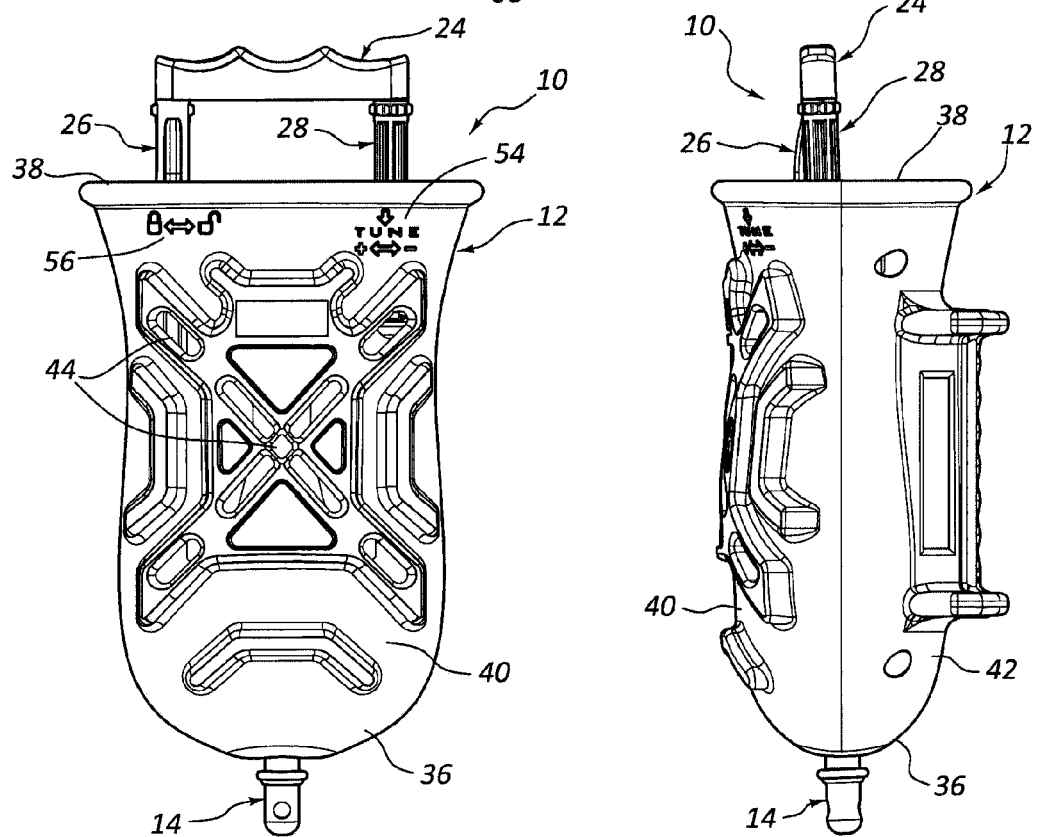
FIG. 2 is a top view of the game call of FIG. 1.
Figure 3:
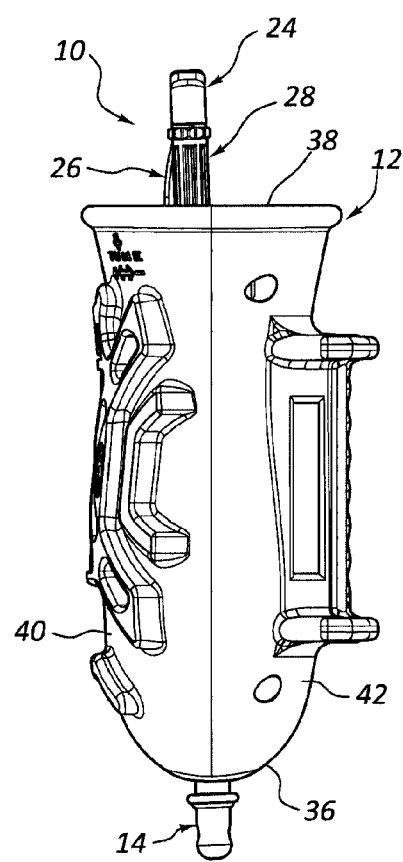
FIG. 3 is a side view of the game call of FIG. 1.
Figure 6:
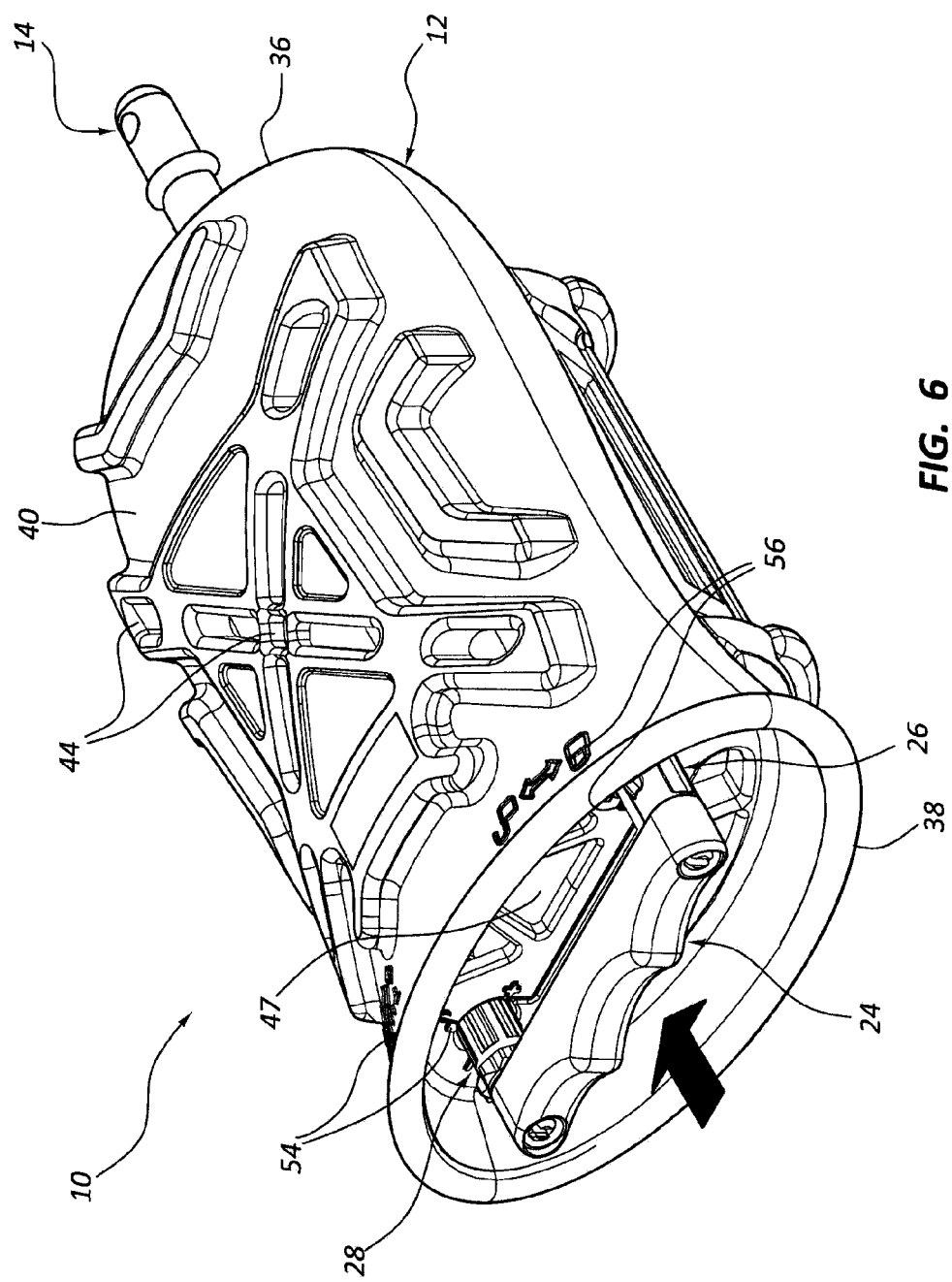
FIG. 6 is a perspective view of the game call of FIG. 1 with a push rod advanced forward to operate the game call.

The adjustment indicia 54 and locking indicia 56 may be positioned at various locations on housing 12 that are visible to the operator during operation of the game call 10. The adjustment indicia 54 may include arrows that show the operator what direction to move the tone adjustment member 28 to increase the biasing force applied by second biasing member 22 to the friction plate 16. FIG. 2 shows the adjustment indicia 54 positioned on the top housing member 32 aligned with the first rod opening 50. The adjustment indicia 54 may also include an arrow pointing in an axially direction that instructs the operator to move the tone adjustment member 28 in an axially direction relative to handle 24 to permit rotation of the tone adjustment member 28. The adjustment indicia 54 may include an arrow pointing in a lateral direction with plus and minus signs, which instruct the operator to rotate the tone adjustment member 28 to increase or decrease the tension in the second biasing member 22. The adjustment indicia 54 may include the term "tune" or other term or symbol that informs the operator that the tone adjustment member 28 adjusts sound generated by the game call 10. Other terms, arrows, or different indicia may be used to provide visual instructions for the operator.

The adjustment indicia 54 may be positioned at other locations on housing 12 such as, for example, directly adjacent to the first rod opening 50 at the rear end 38 as shown in FIGS. 5A and 7A-B. The adjustment indicia 54 at this location may include a note symbol that indicates to the operator that adjustment of the tone adjustment member 28 adjusts a sound generated by the game call 10, and may include a rotation arrow.

The locking indicia 56 may be included on the top housing member 32 along the top surface 40 (see FIG. 2). A separate set of locking indicia 56 may be positioned at the rear end 38 adjacent to the second rod opening 52 (see FIGS. 5A and 7A-B). The locking indicia 56 may include a padlock symbol in a locked orientation and in an unlocked orientation. The locking indicia 56 may include an arrow arranged in a lateral direction that provides instruction for the operator to rotate the locking sleeve 26 to move between locked and unlocked positions. Other symbols and orientations may be used for the locking indicia 56 in other arrangements.

The lock recess 58 may be provided in the housing 12 at a location adjacent to the second rod opening 52. The lock recess 58 may receive a portion of locking sleeve 26 when the locking sleeve 26 is in a locked position. The lock recess 58 may hold the locking sleeve 26 in a desired rotated position until the locking sleeve 26 is intentionally rotated by an operator.

The support surface 55 shown in FIGS. 7A-B is sized and configured to receive and support the tone board 30 (see FIGS. 9-11A). In at least one example, the support surface 55 has a shape that matches an outer profile of the tone board 30.

The support members 53 may be arranged and configured to support the housing 12 on a support surface. In one example, the support surface is a horizontal surface and the support members 53 hold the game call 10 in a horizontal position relative to the support surface.

Figure 8:
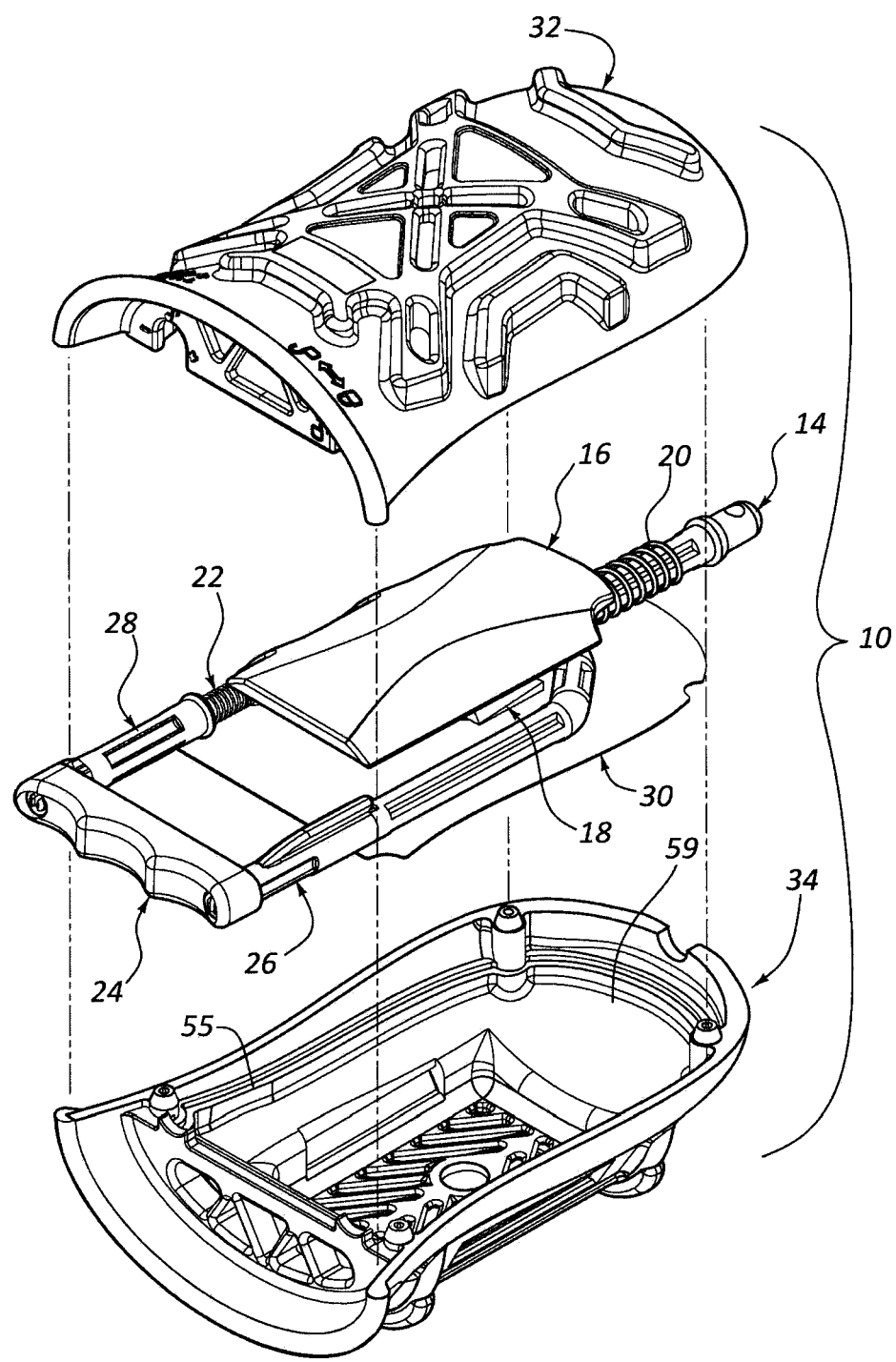
FIG. 8 is a partial exploded perspective view of the game call of FIG. 1.
Figure 11A:
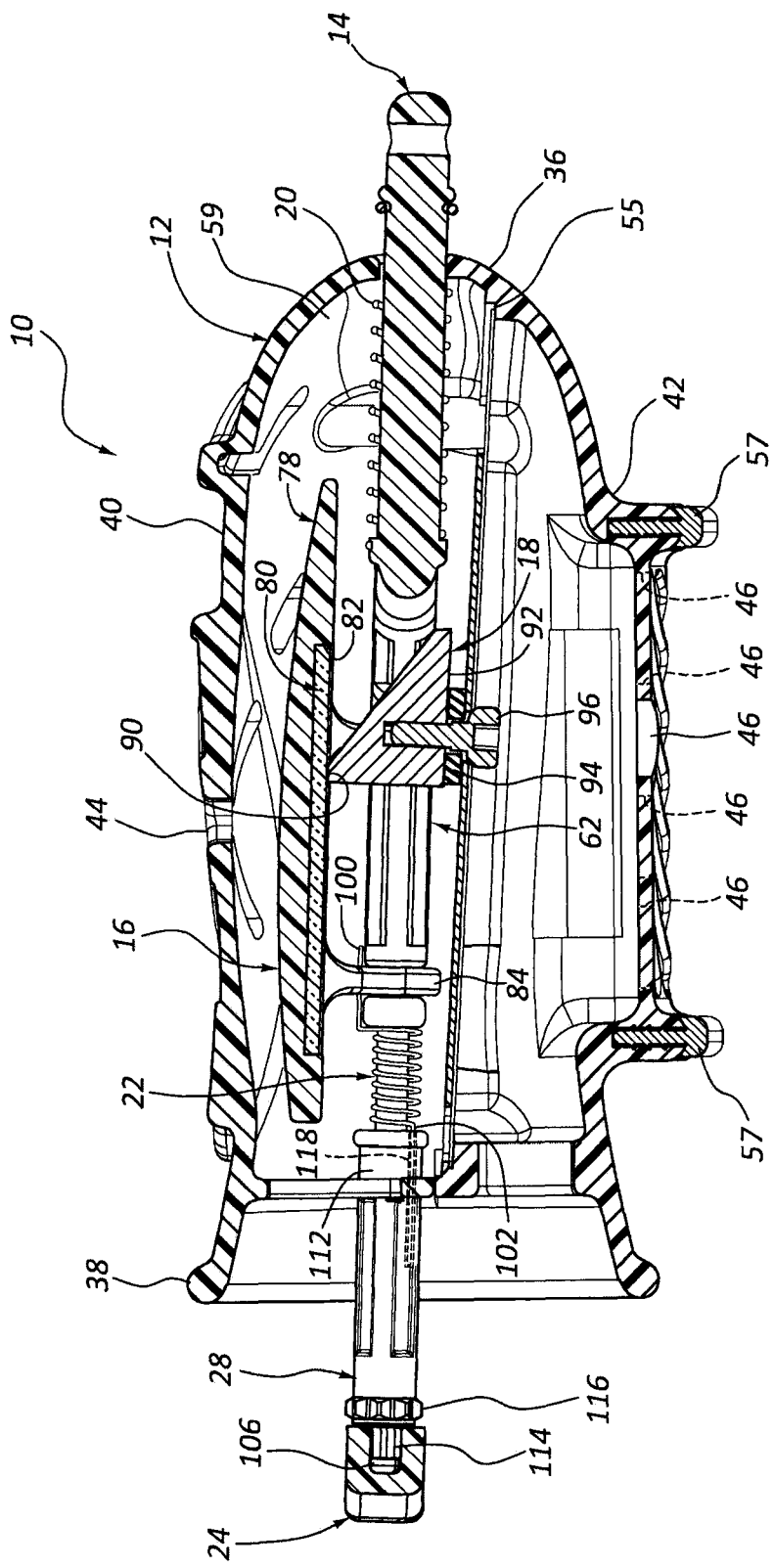
FIG. 11A is a cross-sectional view of the game call of FIG. 1 with the push rod in a first position.
Figure 11B:
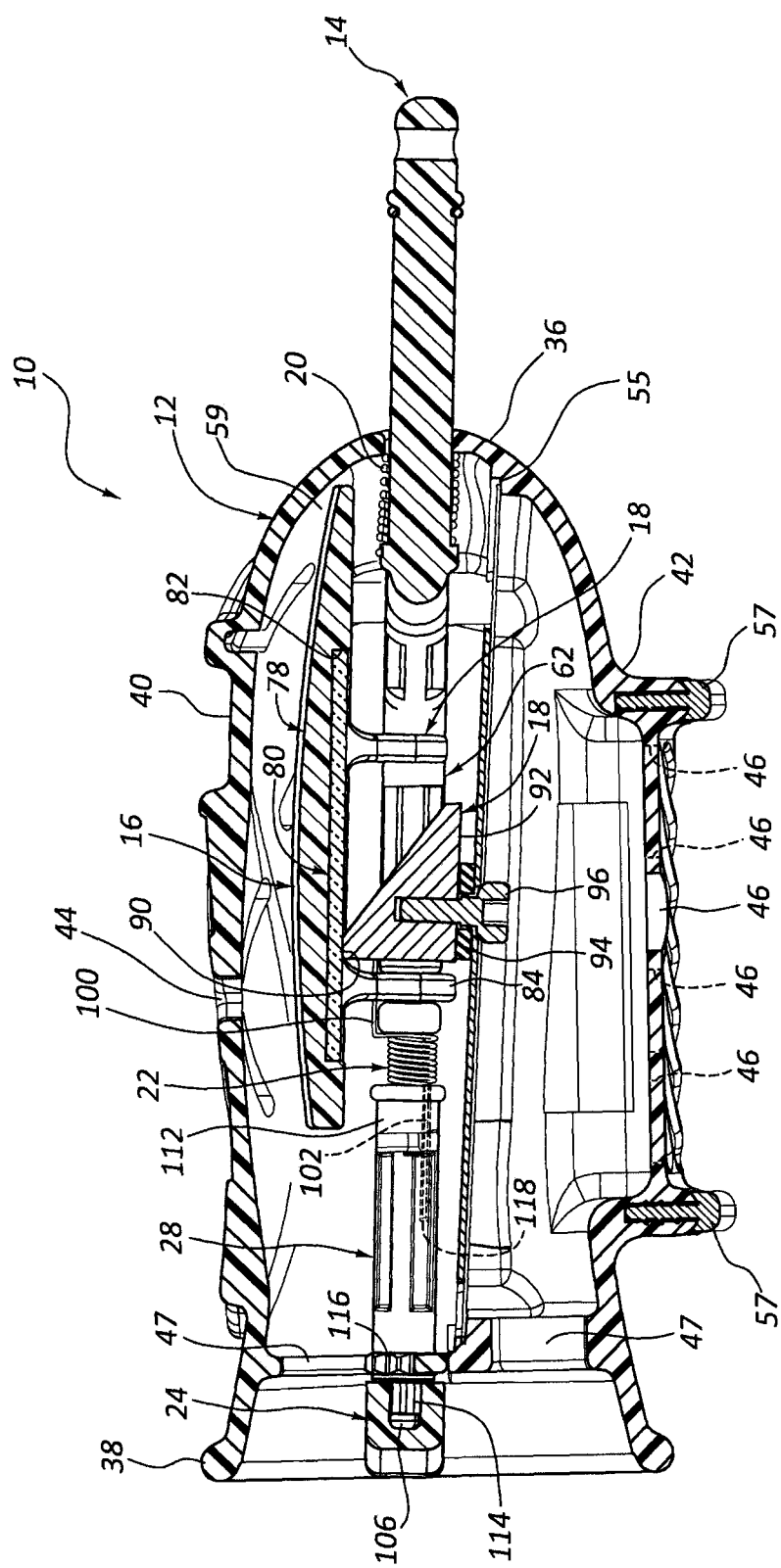
FIG. 11B is a cross-sectional view of the game call of FIG. 1 with the push rod in an advanced position.

The push rod 14 is described in further detail with reference to FIGS. 7A-B and 8. The push rod 14 includes a support portion 60 and first and second legs 62, 64 that extend from the support portion 60. The support portion 60 extends through the front rod opening 48 in the housing 12. The support portion 60 includes a forward stop surface 66 and a spring retention portion 68. The forward stop surface 66 may include a dampening member such as, for example, a rubber O-ring. The forward stop surface 66 may act as a stop surface when the push rod 14 is retracted and held in a locked position as shown in FIG. 12B. The spring retention portion 68 may be sized and configured to retain the first biasing member 20 relative to the housing 12 as shown, for example, in FIGS. 9-11B.

Figure 9:
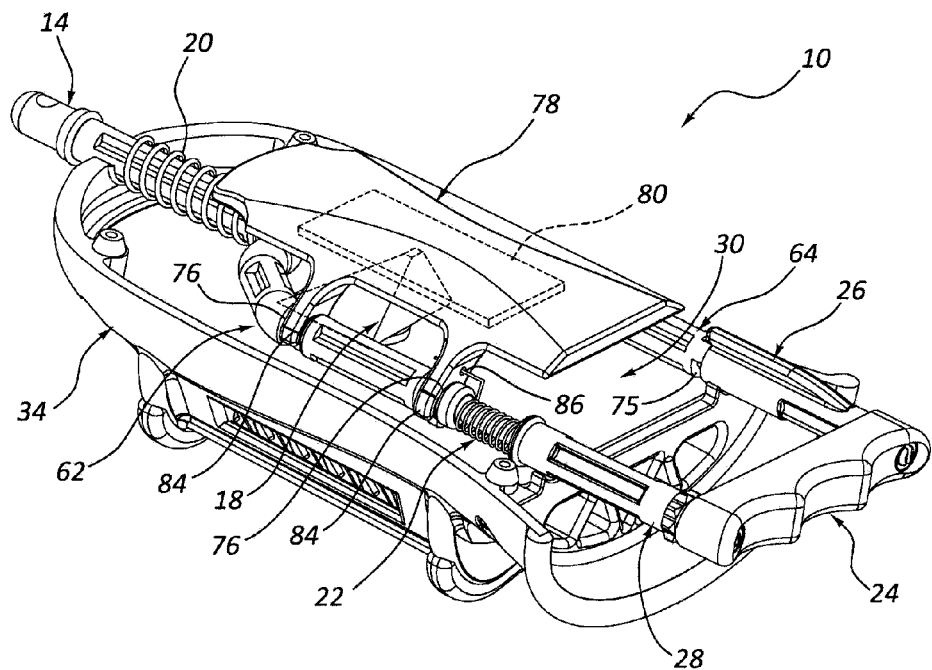
FIG. 9 is a perspective view of the game call of FIG. 1 with a top housing member removed.
Figure 10:
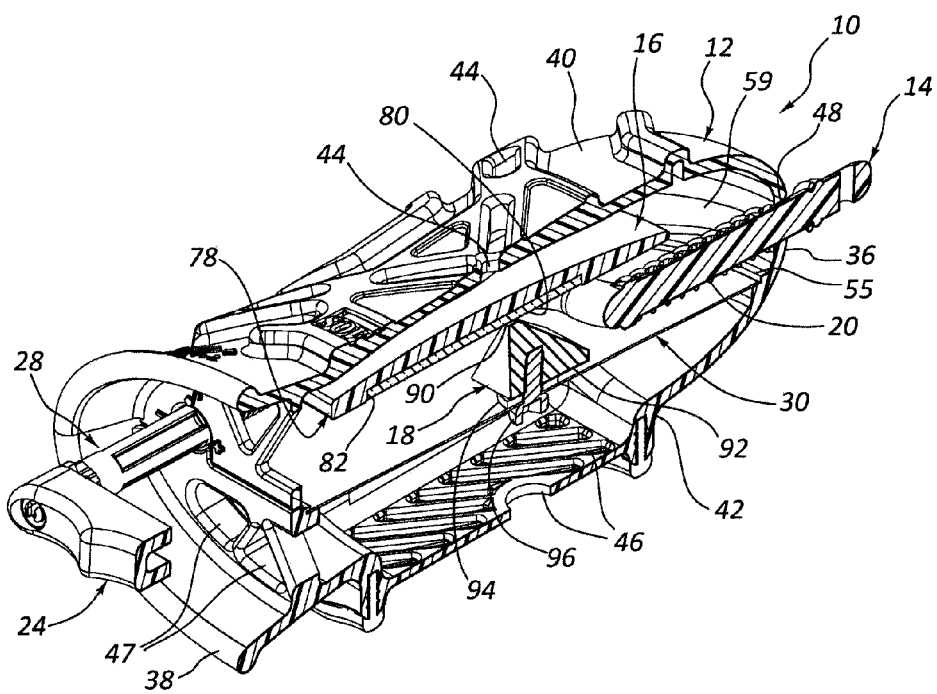
FIG. 10 is a cross-sectional view of the game call of FIG. 1 taken along cross-section indicators 10-10.

The first and second legs 62, 64 each include a handle attachment feature 70 and one of the first and second stop surfaces 72, 74, respectively. The first stop surface 72 provides a backstop for the second biasing member 22 as shown in FIGS. 9-12B. The second stop surface 74 may provide a stop surface to restrict axial movement of the locking sleeve 26 (see FIG. 8). A track 75 may be formed in the second leg 64 adjacent to the second stop surface 74 as shown in FIG. 9. The track 75 may receive a follower pin 73 or other feature extending from the locking sleeve 26 to limit rotational movement of the locking sleeve 26 relative to the second leg 64 (see FIGS. 7A-B).

The first leg 62 may further include at least one friction plate mounting recess 76. The friction plate mounting recess 76 receives mounting features of the friction plate 16 for pivotal mounting of the friction plate 16 relative to the push rod 14. The friction plate mounting recess 76 may restrict axially movement of the friction plate 16 relative to push rod 14.

The friction plate 16 is shown in FIGS. 7-11B including a carrier member 78 and a friction member 80. The carrier member 78 includes a recess 82 sized to receive and retain the friction member 80. The carrier member 78 also includes at least one connection arm 84 for mounting the friction plate 16 to the push rod 14. The carrier member 78 may include a first bias member attachment aperture 86 that receives a portion of the second biasing member 22, wherein the second biasing member 22 transfers a rotational force to the friction plate 16. The connection arm 84 is mounted to the friction plate mounting recess 76 of the first leg 62 of the push rod 14 as shown in FIG. 9.

The friction member 80 may comprise any desired material and have any shape, size, or surface features desired to provide generation of sound when interacting with the striker 18. In one example, the friction member 80 comprises a glass material. In other arrangements, the friction member 80 may comprise other materials such as, for example, slate, wood, carbon or other material having high friction properties.

The striker 18 may include an assembly of features including, for example, a striking surface 90, a mounting surface 92, a spacer 94, and a fastener 96. The striking surface 90 may be arranged to contact the friction member 80 of the friction plate 16 as shown in at least FIGS. 10-11B. The mounting surface 92 may face the tone board 30. The spacer 94 may be interposed between the striker 18 and the tone board 30. The fastener 96 may extend through a fastener aperture 120 of the tone board 30 and into the striker 18 to provide a connection there between. In some arrangements, the mounting surface is in direct contact with the tone board 30.

The striker 18 may have any desired shape, size and material composition. The striker 18 is shown in the figures having a pyramid-type structure with a striker surface 90 that is substantially smaller than the mounting surface 92. The striker 18 may transfer vibrations generated during contact with the friction plate 16 into the tone board 30, wherein the tone board 30 generates additional sound in the game call 10. In one example, striker 18 comprises a wood material. Other materials are possible including, for example, styrene and carbon. Further, additional shapes and sizes are possible for striker 18. The shape and size of striker 18 may be limited based on, for example, the size of housing 12 and materials of the striker 18 and friction member 80

The first biasing member 20 may be a compression spring. Alternatively, first biasing member 20 may be an extension spring having one end fixed to the push rod 14 and an opposite end fixed to the housing. Other types of biasing members are possible including, for example, leaf springs and resilient materials such as rubber or foam that apply a biasing force when compressed or deformed.

The second biasing member 22 may be constructed to apply a rotation force to the friction plate 16. The second biasing member 22 may be interposed between the locking sleeve 26 and the first stop surface 72 of the push rod 14. The second biasing member 22 may include a first end 100 that is connected to the friction plate 16 (e.g., inserted into the first biasing member attachment aperture 86). The second biasing member 22 may include a second end 102 that is connected to the tone adjustment member 28. The second end 102 may extend into, for example, a second bias member attachment aperture 118 of the tone adjustment member 28 (see FIG. 11A). With this arrangement of the second biasing member 22, rotation of the tone adjustment member 28 increases tension in the second biasing member 22 thereby adjusting a rotation force applied by the second biasing member 22 to the friction plate 16. Increasing tension in the second biasing member 22 increases a rotation force applied to the friction plate 16 that rotates the friction plate 16 into contact with the striker 18 such that greater friction exists between the friction plate 16 and striker 18. The amount of friction force between the friction plate 16 and striker 18 influences the tone and other characteristics of the sound generated by the game call 10 as the push rod 14 is advanced axially relative to housing 12.

The handle 24 may be mounted to the push rod 14. The handle 24 may provide an interface for the user to axially operate the push rod 14. The handle 24 may be connected to the first and second legs 62, 64 and push rod 14. In one example, the handle 24 includes a gripping surface 104, which the operator contacts to move the push rod 14. The handle 24 may also include a pair of connection recesses 106 into which the handle attachment features 70 of the first and second legs 62, 64 extend for connection of the handle 24 to the push rod 14. The handle 24 may further include a retention recess 108 that receives a portion of the tone adjustment member 28 to hold the tone adjustment member 28 in a desired rotated position relative to the first leg 62. The retention recess 108 may be arranged coaxially with the connection recess 106 into which the first leg 62 extends. The retention recess 108 may include a plurality of protrusions or recesses that limit rotation of the tone adjustment member 28 when the tone adjustment member 28 is inserted therein.

In one example, the tone adjustment member 28 includes distal and proximal ends 112, 114 and a positioning member 116. The second end 102 of the second biasing member 22 is connected to the distal end 112 (see FIG. 11A). The second end 102 may extend through a second bias member attachment aperture 118 formed in the tone adjustment member 116 as shown in FIG. 11A. The proximal end 114 may include a plurality of recesses or protrusions that mate with cooperative features within the retention recess 108 to restrict rotation of the tone adjustment member 28 relative to the handle 24. The tone adjustment member 28 may be moved axially out of the retention recess 108 so that the tone adjustment member 28 may be rotated to adjust tension in the second biasing member 22. When the desired amount of tension is achieved in the second biasing member 22, the tone adjustment member 28 may be retracted axially into the retention recess 108 to fix the rotated position of the tone adjustment member 28 relative to handle 24 and the push rod 14. The positioning member 116 may be used by the operator to help rotate the tone adjustment member 28 relative to the first leg 62.

The locking sleeve 26 may include a locking protrusion 110 that extends radially outward. The locking sleeve 26 may further include a proximal end 109 arranged adjacent to the handle 24, and a distal end surface 111. The distal end surface 111 may include a portion of the locking protrusion 110.

Figure 12A:
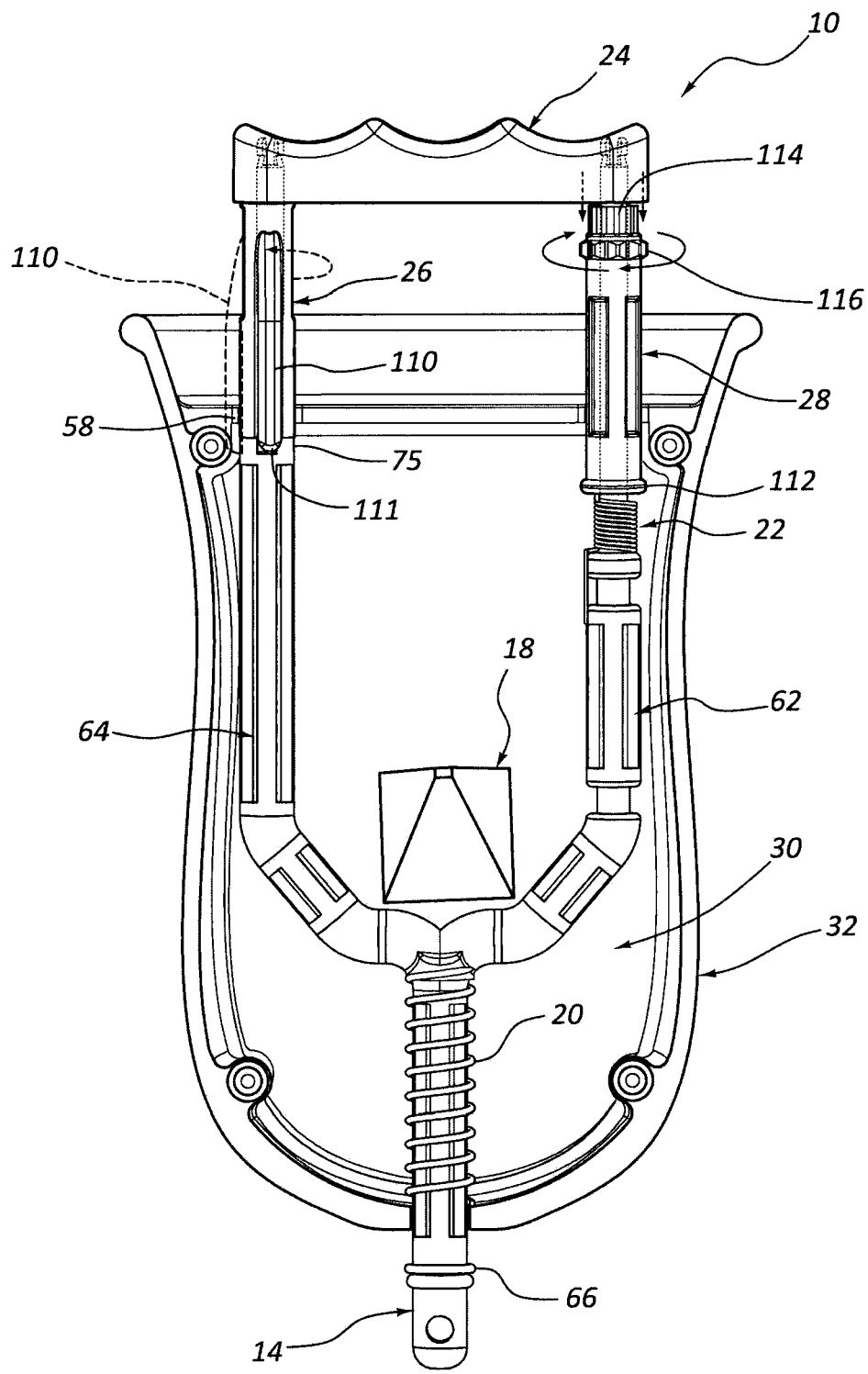
FIG. 12A is a top view of the game call of FIG. 9 with the push rod in an unlocked position.
Figure 12B:
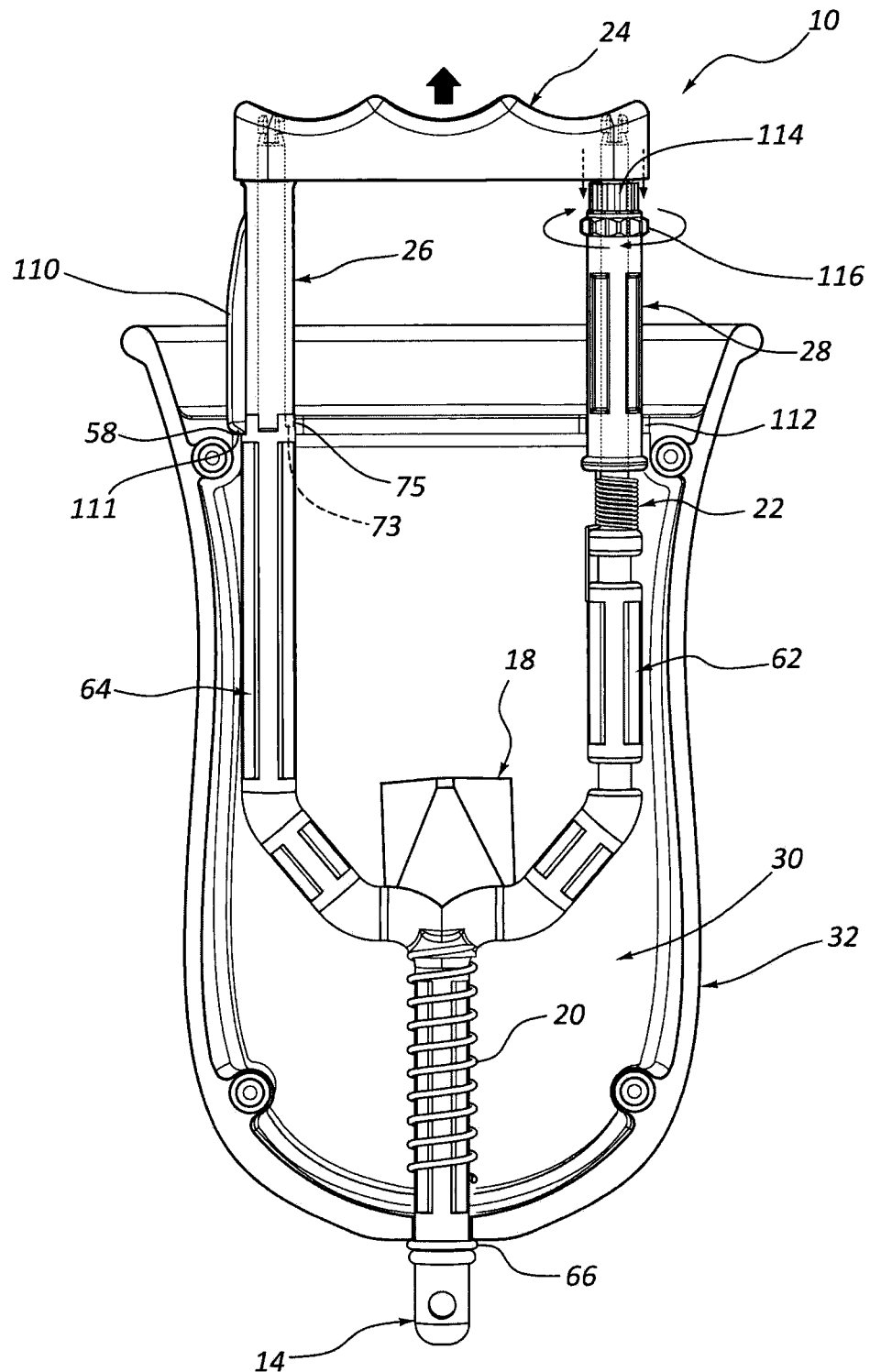
FIG. 12B is a top view of the game call of FIG. 9 with the push rod in a locked position.

When the locking sleeve 26 is in an unlocked position as shown in FIG. 12A, the locking sleeve 26 is able to move with the push rod 14 in an axial direction through the second rod opening 52. The locking sleeve 26 is restricted from rotating into the locked position when the locking sleeve 26 is positioned within the second rod opening 52. The push rod 14 may be retracted as shown in FIG. 12B to position the locking protrusion 110 out of the second rod opening 52. The distal end surface 111 of the locking protrusion 110 may then be retracted into the lock recess 58 upon rotating the locking sleeve 26 as shown in a comparison of FIGS. 12A and 12B.

When the locking protrusion 110 is positioned within the lock recess 58, the push rod 14 is restricted from moving axially in a forward direction relative to the housing 12, thereby fixing an axial position of the friction plate 16 in a forward direction relative to striker 18. Typically, the forward stop surface 66 of the support portion 60 of the push rod 14 is moved into contact with the front end 36 of housing 12 while the locking sleeve 26 is rotated into the locked position shown in FIG. 12B thereby also preventing axial movement of the push rod 14 in the retracted direction relative to housing 12.

This arrangement of the locking sleeve 26 when in the locked position along with the other features of game call 10 may significantly reduce the chance of inadvertently generating sound with the game call 10 while the game call 10 is in a locked state. Typically, the operator is required to actively rotate locking sleeve 26 in order to move the game call 10 into an unlocked state in which the push rod 14 is movable axially relative to housing 12.

In at least some arrangements, the game call 10 is configured such that the operator is required to proactively retract the push rod 14 from its rest position shown in FIGS. 1 and 12A in order to operate the locking sleeve 26 into a locked position. In other arrangements, the locking sleeve 26 is operable into a locked position while the push rod 14 is in the rest position of FIGS. 1 and 12A. The game call 10 may include additional biasing members that help maintain the push rod into a rest position or other position in which the locking sleeve 26 is operable into a locked position.

One method of operating the game call 10 disclosed herein is to rest the game call 10 upon a support surface with the support members 53 of the housing 12 resting upon the support surface. The operator may operate the game call 10 with a single hand by placing the operator's hand along the top surface 40, grasping opposing sides of the housing 12 with the thumb and at least one of the ring and pinkie fingers, and extending at least one of the index and middle fingers into contact with the handle 24. The operator may then use one of the index and middle finger to axially move the push rod 14 into an advanced position relative to the housing 12 to create sound by sliding contact between the friction plate 16 and striker 18. The operator may release the handle 24 and the first biasing member 20 moves the push rod 14 from the advanced position shown in FIG. 6 to the rest position shown in FIG. 1.

The operator may adjust the tone quality of the sound generated by game call 10 by holding the handle 24 with one hand and moving the tone adjustment member 28 axially away from the handle 24 as shown in FIG. 12A. The operator may then rotate the tone adjustment member 28 in either the clockwise or counterclockwise direction as desired to change the tension in second biasing member 22, thereby adjusting a rotation force applied to the friction plate 16 to alter a friction interface between the friction plate 16 and striker 18. The operator may then return the tone adjustment member 28 into contact with the handle 24 (i.e., insert the proximal end 114 into the retention recess 108).

The operator may lock the push rod 14 relative to the housing 12 by first retracting the handle 24 from the rest position shown in FIGS. 1 and 12A to the retracted position shown in FIG. 12B. While holding the handle 24 in the retracted position with one hand, the operator uses an opposing hand to rotate the locking sleeve 26 into the locked position shown in FIG. 12B. Alternatively, the operator may grasp the locking sleeve 26 and apply an axial force in a retraction direction while concurrently rotating the locking sleeve 26 between locked and unlocked positions. The game call 10 typically retains the locked position shown in FIG. 12B until the operator intentionally rotates the locking sleeve 26 back into the unlocked position shown in FIG. 12A so that the handle 24 may return to the rest position shown in FIG. 12A.

The arrangement of FIGS. 1-12B makes possible use of the game call 10 to generate sound using one hand operation. The game call 10 may be operated to adjust a tone generated by the game call 10 or to adjust the game call 10 into a locked position using one or two hands.

Unless otherwise noted, the terms "a" or "an", as used in the specification and claims, are to be construed as meaning "at least one of." In addition, for ease of use, the words "including" and "having", as used in the specification and claims, are interchangeable with and have the same meaning as the word "comprising."

What is claimed is:
1. A game call, comprising:
   a push rod having distal and proximal end portions and a longitudinal axis;
   a friction plate mounted to the push rod;
   a striker;
   a first biasing member configured to bias the push rod in a proximal direction;
   a second biasing member configured to rotate the friction plate into contact with the striker;
   a locking sleeve, the push rod being inserted into the locking sleeve, the locking sleeve being configured to fix an axial position of the friction plate relative to the striker along the longitudinal axis of the push rod.
2. The game call of claim 1, wherein tension in the second biasing member is adjustable to alter a rotational force applied to rotate the friction plate.
3. The game call of claim 1, wherein the push rod includes first and second legs, the friction plate and second biasing member being mounted to the first leg, and the locking sleeve being mounted to the second leg.
4. The game call of claim 1, wherein the first biasing member is positioned at the distal end portion of the push rod, and the locking sleeve is positioned at the proximal end portion of the push rod.

5. The game call of claim 1, further comprising a tone board, the striker being mounted to the tone board.

6. The game call of claim 1, further comprising a housing, the striker being fixed relative to the housing, and the push rod and friction plate being movable relative to the housing.

7. The game call of claim 1, wherein the locking sleeve rotates between a locked position and an unlocked position.

8. The game call of claim 1, further comprising a tone adjustment member connected to the second biasing member and rotatable to adjust tension in the second biasing member.

9. A method of operating a game call, comprising:
providing a housing, a push rod, a friction plate, a striker, and a locking sleeve, at least one of the friction plate and striker being connected to the push rod, the push rod being inserted into the locking sleeve;
moving the push rod axially relative to the housing to move the friction plate and striker into sliding contact with each other to generate sound;
operating the locking sleeve from an unlocked position to a locked position to fix a longitudinal position of the push rod relative to the housing to fix a position of the striker relative to the housing to limit generation of sound.

10. The method of claim 9, wherein the striker is mounted to the housing and the friction plate is mounted to the push rod, the friction plate being movable relative to the striker.

11. The method of claim 9, further comprising a biasing member configured to rotate the friction plate relative to the push rod and into contact with the striker.

12. The method of claim 9, wherein the push rod includes first and second legs, the friction plate being mounted to the first leg and the locking sleeve being mounted to the second leg.

13. The method of claim 9, further comprising biasing the push rod in a first direction and moving the push rod axially in a second direction, which is opposite to the first direction, to move the friction plate and striker into sliding contact with each other to generate sound.

14. A game call, comprising:
a push rod having distal and proximal end portions;
a friction plate mounted to the push rod;
a striker;
a first biasing member configured to bias the push rod in a proximal direction;
a second biasing member configured to rotate the friction plate into contact with the striker;
a locking sleeve connected to the push rod and configured to fix an axial position of the friction plate relative to the striker;
wherein the push rod includes first and second legs, the friction plate and second biasing member being mounted to the first leg, and the locking sleeve being mounted to the second leg.

* * * * *